S. A. FULLER, Jr.
Hub-Attaching Device.

No. 225,819. Patented Mar. 23, 1880.

Witnesses:
Warren Seely
Frank Middleton

Inventor:
Samuel A. Fuller Jr.
by Ellis Spear
Attorney

United States Patent Office.

SAMUEL A. FULLER, JR., OF DERRY, NEW HAMPSHIRE.

HUB-ATTACHING DEVICE.

SPECIFICATION forming part of Letters Patent No. 225,819, dated March 23, 1880.

Application filed January 9, 1880.

*To all whom it may concern:*

Be it known that I, SAMUEL A. FULLER, Jr., of Derry, in the county of Rockingham and State of New Hampshire, have invented a new and useful Improvement in Attaching Wheels; and I do hereby declare that the following is a full, clear, and exact description of the same.

My invention relates to means for securing wheels to their axles, and is intended to take the place of the nut now ordinarily used for that purpose.

The objects sought to be secured by the invention are, first, to provide a device which may be more readily manipulated than the ordinary nut or any of the locking devices now known, which shall not require the use of a wrench, which shall not be liable to be lost by separation from the hub of the wheel, and which may be operated without soiling the hands with the axle-grease.

Figure 1:
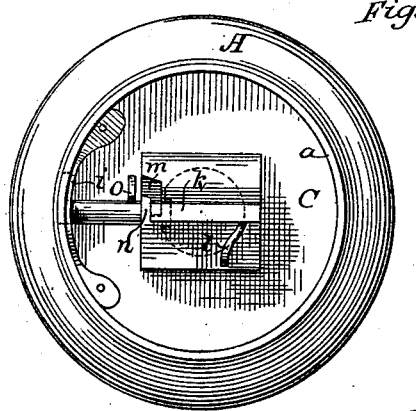
Figure 2:
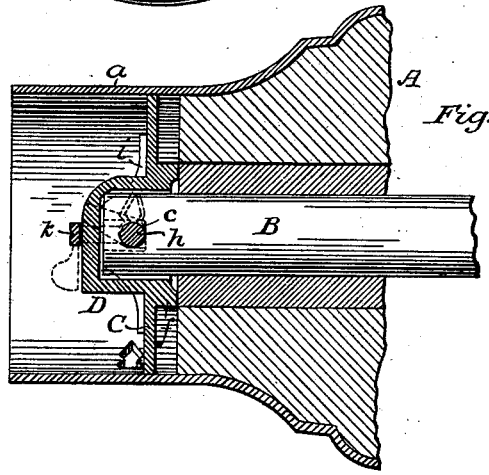
Figure 3:
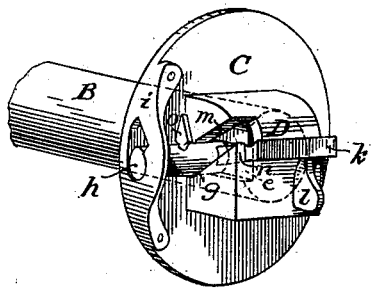

My invention is illustrated in the accompanying drawings, in which Figure 1 shows an end view with the nut in place. Fig. 2 shows a central longitudinal section of the nut and axle, and Fig. 3 shows a perspective view of the nut.

In these drawings, A represents the outer end of the hub of an ordinary wheel, with the outer ring or shell, $a$, of ordinary form. B represents the axle, which projects through the solid part of the hub and terminates a short distance within the outer shell.

Instead of the thread the end of the axle is provided with a perforation, $c$, through which, if preferred, a slot may be cut through to the end, as shown at $e$.

Fitted closely within the outer shell is a disk, C, which performs the functions of the ordinary nut. This disk may be provided with a flange, $f$, slightly flared outwardly for the easy admission of the end of the axle.

Upon the outside of the disk is a hollow boss, D, the cavity in which is exactly fitted to receive the end of the axle. Through this boss a hole is formed, as shown at $g$, close to the outer surface of the nut. Through this perforation a small bolt, preferably of steel or of tough wrought-iron, (marked $h$ in the drawings,) is made to pass. Its length is such that when in place in the end of the axle its outer end shall be flush with the outer edge of the disk.

A perforated flange, $i$, on the edge of the disk, serves to guide the bolt in its movement up and down.

For convenience of manipulation a bent arm, $k$, is fixed upon the bolt and is provided with a thumb-piece, $l$. The horizontal part of this arm $k$, after passing through the slot $m$ in the upper part of the boss, by the slight turn to the left is lodged under the shoulder $n$, which locks the bolt securely in place. The small pin $o$ upon the side of the bolt prevents it from turning to the right farther than is necessary.

The guide-flange on the outer edge of the disk is cut away to permit the bolt, with the pin, to move freely out.

Obviously a perforation must be made in the casing of the hub to permit the bolt to pass out when it is released from the axle. The disk remains stationary upon the axle, and the bolt is held securely in place, first, by its own gravity; second, by the arm $k$ locking under the shoulder $n$; and, third, by the casing $a$, it being possible to remove it only when the hole in the casing registers with the bolt.

If desired, a spring may be used to hold the arm $k$ under the shoulder $n$, or the bolt $h$ may be held down by a spring without any locking device, the bolt passing through the perforated lugs on the outer face of the disk.

When the axle is removed the nut may be held to the hub by simply letting the arm $k$ rest upon the upper side of the shoulder $n$, which will hold the pin engaged with the shell, thus fastening the locking-disk securely to the wheel.

Manifestly, instead of the hole in the end of the axle, a notch in the side may be used with the same effect.

Having thus described my invention, what I claim as new, and desire to secure by Letters Patent, is—

1. In combination with a disk, C, adapted to fit within the shell $a$, the bolt $h$, the flange $i$, the boss D, and the arm $k$, the latter operating, in connection with the slot $m$ and the shoulder $n$, as and for the purpose set forth.

2. In combination with the disk C, provided with a boss, D, locking-arm $k$, and perforated flange $i$, the pin $o$, as and for the purpose set forth.

In testimony whereof I have signed my name to this specification in the presence of two subscribing witnesses.

SAMUEL A. FULLER, Jr.

Witnesses:
S. A. FULLER,
SAML. A. FULLER,
GREENLEAF C. BARTLETT.